(12) United States Patent
Shah et al.

(10) Patent No.: US 10,787,111 B2
(45) Date of Patent: Sep. 29, 2020

(54) LIGHT-GUIDING OPTICAL SYSTEM, ESPECIALLY FOR MOTOR VEHICLES

(71) Applicant: Varroc Lighting Systems, s.r.o., Senov u Noveho Jicina (CZ)

(72) Inventors: Nitesh Shah, Maharashtra (IN); Jan Martoch, Hranice (CZ)

(73) Assignee: Varroc Lighting Systems, s.r.o., Senov u Noveho (CZ)

( * ) Notice: Subject to any disclaimer, the term of this patent is extended or adjusted under 35 U.S.C. 154(b) by 0 days.

(21) Appl. No.: 16/450,421

(22) Filed: Jun. 24, 2019

(65) Prior Publication Data

US 2019/0389364 A1    Dec. 26, 2019

(30) Foreign Application Priority Data

Jun. 25, 2018    (CZ) .................................. 2018-305

(51) Int. Cl.
*B60Q 1/00*    (2006.01)
*F21S 43/237*    (2018.01)
(Continued)

(52) U.S. Cl.
CPC ............ *B60Q 1/0011* (2013.01); *F21S 41/24* (2018.01); *F21S 41/322* (2018.01); *F21S 43/237* (2018.01); *F21S 43/247* (2018.01); *F21S 43/315* (2018.01)

(58) Field of Classification Search
CPC . B60Q 1/0011; B60Q 3/64; B60Q 3/62; F21S 41/24; F21S 41/322; F21S 41/147;
(Continued)

(56) References Cited

U.S. PATENT DOCUMENTS 7,334,923 B2 *    2/2008    Tanaka ..................... B60Q 1/26
                                                                362/494
7,478,942 B2 *    1/2009    Kim ..................... G02B 6/0036
                                                                349/65
(Continued)

FOREIGN PATENT DOCUMENTS

CZ    305927 B6    5/2016
DE    3542292 A1    7/1986
(Continued)

OTHER PUBLICATIONS

Search Report dated Mar. 26, 2019 from Corresponding Czech Application No. PV 2018-305 (3 pages).

*Primary Examiner* — Peggy A Neils
(74) *Attorney, Agent, or Firm* — Hovey Williams LLP (57) ABSTRACT

The light-guiding optical system comprises at least one light source (2) and a light guide (1) for coupling and guiding light rays (10) emitted by a light source (2). Furthermore, the light guide (1) may comprise a decoupling surface (4) on its rear side (13) and an output surface (3) for the exit of light rays (10) decoupled by the decoupling surface (4) on an opposite front side (14). The decoupling surface (4) comprises: (i) first decoupling elements (5) configured to decouple light rays (10) falling onto the first decoupling elements (5) out of the light guide (1) approximately in a pre-determined first output direction (p) to fulfill a first light function, and (ii) a second decoupling element (6) configured to uncouple light rays (10) falling onto the second decoupling elements (6) out of the light guide (1) approximately in a pre-determined second output direction (d), which is deflected from the first output direction (p), to fulfill the second light function.

15 Claims, 6 Drawing Sheets

(51) Int. Cl.
F21S 41/32 (2018.01)
F21S 43/31 (2018.01)
F21S 41/24 (2018.01)
F21S 43/247 (2018.01)

(58) Field of Classification Search
CPC ...... F21S 43/237; F21S 43/247; F21S 43/315; F21S 43/245; F21S 41/36; F21S 43/235; G02B 6/00
See application file for complete search history.

(56) References Cited

U.S. PATENT DOCUMENTS

| | | | |
|---|---|---|---|
| 8,333,493 B2* | 12/2012 | Taleb-Bendiab | B60Q 1/0035 362/511 |
| 8,454,214 B2* | 6/2013 | Kazaoka | B60Q 1/2665 362/249.02 |
| 2007/0121334 A1 | 5/2007 | Bourdin et al. | |
| 2012/0274462 A1 | 11/2012 | Martinez et al. | |
| 2016/0207446 A1* | 7/2016 | Kumegawa | B60Q 1/30 |
| 2017/0261170 A1* | 9/2017 | Tananaev | B60Q 1/04 |

FOREIGN PATENT DOCUMENTS

| | | |
|---|---|---|
| EP | 2650600 A1 | 10/2013 |
| EP | 2955432 A2 | 12/2015 |

* cited by examiner

LIGHT-GUIDING OPTICAL SYSTEM, ESPECIALLY FOR MOTOR VEHICLES

RELATED APPLICATIONS

This application claims the priority benefit of Czech Patent Application Serial No. PV2018-305 entitled "A light-guiding optical system, especially for motor vehicles," filed Jun. 25, 2018, the entire disclosure of which is incorporated herein by reference.

FIELD OF THE INVENTION

The invention relates to a light-guiding optical system, especially for motor vehicles, that comprises a light-guide fitted with decoupling optical elements used to direct light out of the light guide towards the viewer.

BACKGROUND INFORMATION

A light-guiding optical system of motor vehicles is an optical device comprising a light guide designed to conduct light bound (coupled) from a light source to a point or an array of points with a minimal loss of energy. Today, light guides are a frequent optical element used in the exterior or interior lighting of vehicles where the light from a light source should be distributed in space in such a way to highlight important stylistic elements as e.g. the outlines around the chambers of individual light functions, edges, or the outlines of the entire lamp. The conduction of light in light guides is based on the principle of total light reflection. Light bound to a light guide from a light source, most frequently a LED (light-emitting diode) propagates along the optical axis through the light guide, using total reflection from the cylindrical walls of the light guide. A light ray bound from the light source spreads in the light guide by gradual total reflections from the light guide walls. Total reflection occurs at the interface of two environments having a different refractive index. If a light ray spreads at an angle $\Phi i$ that is bigger than the critical angle $\Phi c$ from an optically denser environment (i.e. environment with a higher refractive index value to an optically sparser environment, i.e. having a lower refractive index value), total reflection occurs at the interface (i.e. the energy of the light ray returns to the original, optically denser environment with 100% efficiency). To break the total reflection conditions, the light guide is equipped with decoupling optical elements. To unbind a ray from the light guide, an array of teeth along the light guide is used that changes the path of the ray in such a way to break the total reflection condition. What happens is that the ray falling onto the decoupling surface of the light guide is returned by total reflection back to the material of the light guide, where it spreads toward the opposite cylindrical surface. On this surface, the ray is refracted and exits the light guide. The array of the decoupling surfaces of the light guide is designed in such a way to exactly define the direction of the unbound (decoupled) light from the light guide. The main factors determining the photometric output from the light guide are the shapes of the array of the decoupling surfaces and the angle that the decoupling surface makes with the longitudinal axis of the light guide, the shape of the cross-section of the light guide, the angle made by the longitudinal axis of the light guide with the vector representing the direction of the desired light output, and also a properly selected position of the light source i.e. which end of the light guide the light source is situated at. Another important parameter that has a considerable impact on the final distribution of light and at the same time substantially influences homogeneous distribution of light along the light guide is the shape of the cross-section of the light guide. In practice, there are two most common types of light-guide cross-sections—a circular profile and a mushroom profile. In both the cases, the decoupling teeth are situated on an auxiliary planar surface the height of which is based on the inclination angle $\alpha$. The height of the teeth is one of important parameters influencing the general photometry and the appearance of the light guide in the lit up state. The displacement of the teeth is further influenced by the geometrical shape of the light guide, for each tooth it is necessary to determine the tangent angle $\beta$ between the tangent at the particular point and the required direction of emitted light and to displace the decoupling tooth of the light guide by half the value of this angle. A light ray falls onto the tooth of the light guide where it experiences a total reflection of light towards the material of the light guide. This totally reflected ray is further refracted on the cylindrical lens of the light guide to the desired, pre-defined direction. If the light source is situated at the opposite side of the light guide, the tooth of the light guide should have such a geometrical shape again to send light to the proper direction, but the incident light is no longer totally reflected on the near surface of the tooth, but only the so-called Fresnel light reflection occurs. For total reflection, 100% efficiency of reflected light is considered while for Fresnel reflection, 4 to 10% reflection efficiency can only be taken into account, the rest of the light being lost.

Light guides used in automotive lighting represent signal light functions, most frequently a front or rear clearance lamp. The documents EP2650600A1 and EP2955432 describe light guides comprising various assemblies of reflective decoupling surfaces. With increasing efficiency of light sources, light guides are gradually beginning to represent signal functions with higher demand for the intensity of emitted light as e.g. brake lights or direction indicator lights in rear lamps while at the same time, the light guide can also fulfill the function of a side marker or a side light. This light function makes sure that the vehicle is clearly visible from oblique/lateral angles as well. Thus, in modern headlights and lamps, light guides that are only oriented perpendicularly to the light axis, i.e. to the driving direction of the vehicle are no longer sufficient. The light guide has a full spatial 3D shape and the decoupling surfaces must send light not only to one proper direction, but the light energy must be divided into different directions so that the light guide can light homogeneously and at the same time fulfill various photometric requirements/functions in different light emission directions.

The object of the present invention is to solve the issue of providing several light functions of a light-guiding optical system wherein light from one light guide must be sent to different directions while the difference of the directions may amount to the angle of up to 90°. Therefore, the object of the invention is to propose a light-guiding optical system that makes it possible to fulfill the required light functions, including high light efficiency and even distribution of the light intensity in two directions with the use of just one light guide. Another object is to make sure that the light-guiding system is adaptable to requirements resulting from the mechanical and optical design of the lighting device, i.e. the light-guide has a fully spatial 3D shape following e.g. the shape of the covering glass of the lamp.

SUMMARY OF THE INVENTION

The above-mentioned objects of the invention are fulfilled by a light-guiding optical system, especially for motor vehicles, comprising at least one light source and light guide for binding (coupling) and guiding of light rays emitted by the light source, comprising on its rear side a decoupling surface and on the opposite front side an output surface for the exit of light rays unbound by the decoupling surface. The decoupling surface comprises the first decoupling elements configured to unbind (decouple) light rays falling onto the first decoupling elements out of the light guide approximately in the pre-determined first output direction to fulfill the first light function, and the second decoupling element configured to unbind light rays falling onto the second decoupling elements out of the light guide approximately in the pre-determined second output direction, deflected from the first output direction, to fulfill the second light function.

In a preferred embodiment, the light guide has an elongated shape and its decoupling surface and output surface are situated in its longitudinal direction.

In another one of preferred embodiments, the first decoupling element is the first reflective surface, which is inclined towards the output surface in the direction from the light source and is configured for reflection of rays falling onto it directly to the output surface and their incidence on the output surface at an angle excluding total reflection, so that these light rays exit from the light guide through the output surface approximately in the said first output direction.

In another preferred embodiment, the second decoupling element is a pair of reflective surfaces—the second reflective surface and the third reflective surface—oriented towards each other at an obtuse angle and configured for reflection of light rays falling onto the second reflective surface directly onto the third reflective surface and their reflection from the third reflective surface directly to the output surface and incidence on the output surface at an angle excluding total reflection so that these light rays exit from the light guide through the output surface approximately in the said second direction.

In another preferred embodiment, in the direction from the light source, the second reflective surface is situated in direct extension of the first reflective surface and the order of positions in the direction from the light source is the first reflective surface, second reflective surface and third reflective surface.

In another preferred embodiment, the first reflective surface and the second reflective surface are connected to each other.

In another preferred embodiment, the second reflective surface and the third reflective surface are connected along a connecting line.

In another preferred embodiment, the decoupling surface further comprises the fourth reflective surface configured for direct reflection of light rays falling onto it towards the output surface and their incidence on the output surface at an angle, which will cause total reflection of light rays from the output surface and their further propagation through the light guide, while the first reflective surface, second reflective surface, third reflective surface and fourth reflective surface are, in the said positional order from the light source, part of the reflective arrangement that repeats itself in the longitudinal direction on the decoupling surface.

The fourth reflective surface can be advantageously approximately parallel to the opposite part of the output surface.

The said connecting line can advantageously lie on a hypothetical surface that is a direct extension of the fourth reflective surface in the direction towards the light source.

According to one of the advantageous embodiments, the lengths of complex reflective arrangements the same light guide is equipped with are identical.

According to another of the advantageous embodiments, at least two of the complex reflective arrangements the same light guide is equipped with have different lengths to achieve the required appearance or homogeneity.

The length (L) of the reflective arrangement is advantageously approximately from 0.7 mm to 3.5 mm.

The second reflective surface preferably makes the angle β from 95° to 150° with the third reflective surface.

In one of preferred embodiments, the first light function is the function of a tail light and the second light function is the function of a side clearance light.

In another preferred embodiment, the first output direction makes an angle of approximately 90° with the second output direction and is approximately parallel to the longitudinal axis of the vehicle.

According to another of the advantageous embodiments, the first light function is the function of a reversing back-up lamp, i.e. the function of a back-up lamp, and the second function is the function of specific points for a camera. Such points are advantageously defined at a different place than points for photometry.

CLARIFICATION OF DRAWINGS

The present invention will be further clarified in more detail with the use of embodiment examples referring to the enclosed drawings where.

EXAMPLES OF EMBODIMENTS OF THE INVENTION

Figure 1:
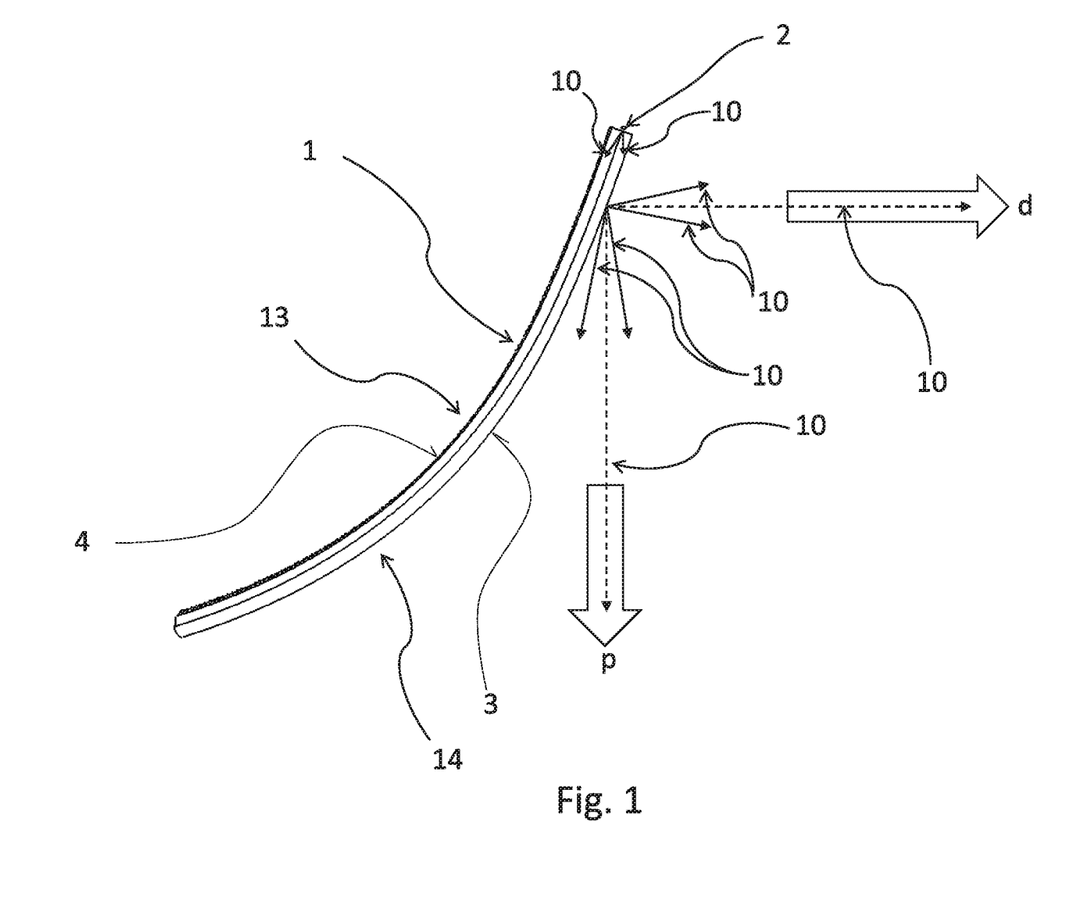
FIG. 1 shows, in a top view, an embodiment example of a light-guiding optical system according to the invention.

FIG. 1 shows, in a top view, an embodiment example of a light-guiding optical system according to the invention. The light-guiding optical system comprises a light source 2 to emit light rays 10 and a light guide 1. The light guide 1 has a rod-like shape and the light source 2 is situated at one of the ends of the light guide 1. Light rays 10 are bound to the light guide 1 and proceed through it in the direction from the light source 2.

The light guide 1 is fitted, on its rear side 13, with an decoupling surface 4 configured to direct light rays 10 to the output surface 3 positioned on the front side 14 of the light guide 1 and also to make sure that the light rays 10 that, on incidence on the output surface 3, did not exit from the light guide 1 through this surface 3, proceed further through the light guide 1 in the direction from the light source 2. In this embodiment, the decoupling surface 4 is configured for two light functions. For the first light function, light rays 10 are directed with a certain diffusion approximately in a predefined first output direction p, which is advantageously parallel to the longitudinal axis of the vehicle. For the second light function, light rays 10 are directed with certain diffusion approximately in the pre-defined second output direction d, the first output direction p and the second output direction d preferably making approximately an angle of 90°, but in other embodiments they may also make a different angle, especially an acute angle. An example of the first light function is the function of the rear tail light and of the second light function the function of a side clearance light.

Figure 2:
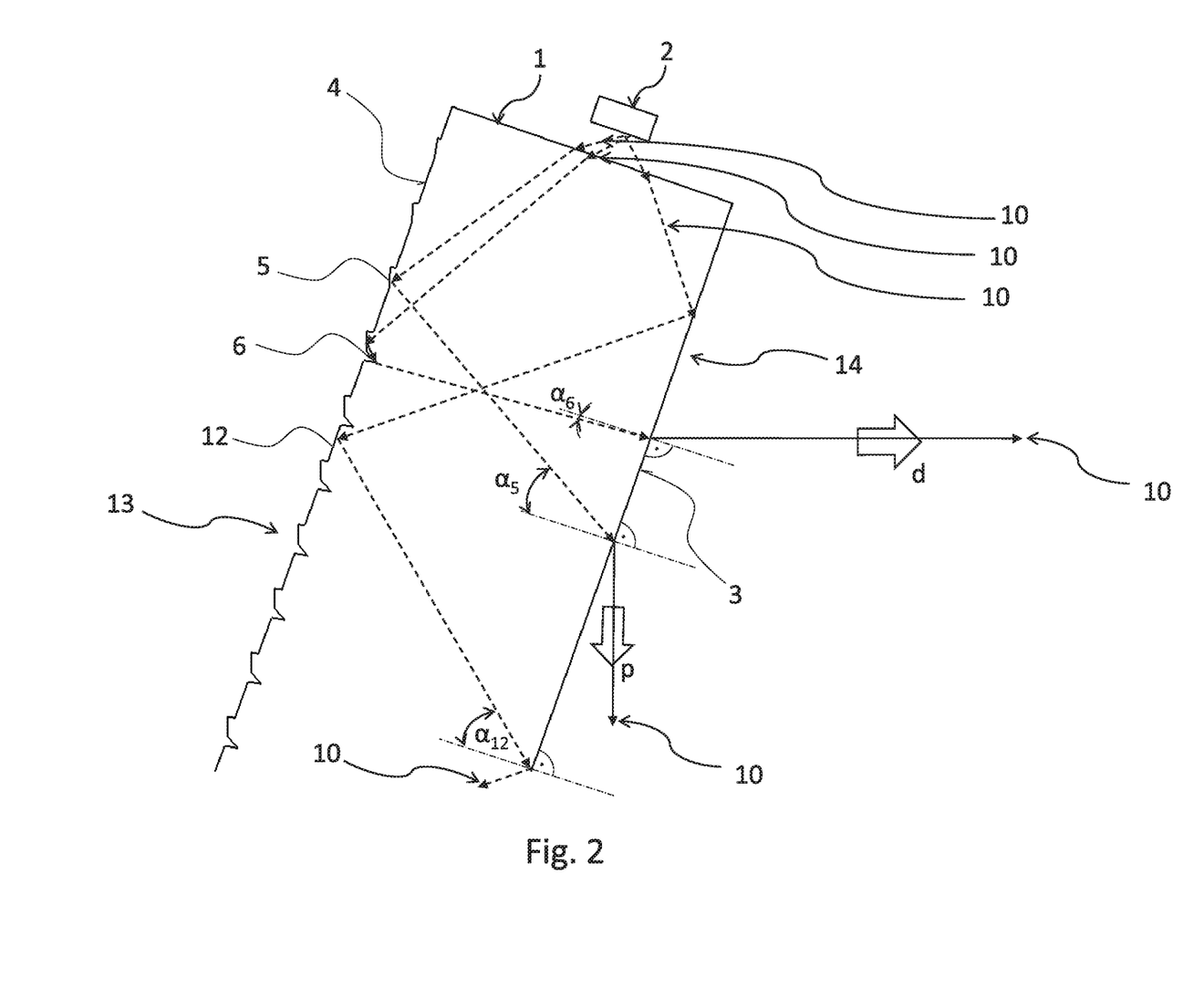
FIG. 2 shows, in a longitudinal cross-section through the longitudinal axis of the invention of FIG. 1, an embodiment example of the decoupling surface of the optical system according to the invention.

FIG. 2 shows, in a longitudinal cross-section through the longitudinal axis of the invention of FIG. 1, an embodiment example of the decoupling surface 4. The decoupling surface 4 comprises the first decoupling elements 5 configured to direct light rays 10 to the output surface 3 in the direction where light rays 10 fall onto the output surface 3 at the angle of incidence $\alpha 5$, measured to the vertical line to the output surface 3 in the place of incidence, ensuring exit of light rays 10 from the output surface 3 approximately in the said first output direction p to guarantee fulfillment of the first light function. The angle of incidence $\alpha 5$ must be such as to exclude total reflection on the output surface 3.

As it is commonly known, on the surfaces that represent transition from one environment to another environment, depending on the refractive index of both the environments and on the value of the angle of incidence of rays on the surface, either refraction occurs on this surface, the rays entering one environment from the other, or a total reflection on the surface occurs, the ray further moving in the original environment, not entering the other environment.

Known relationships generally indicate that the angle of incidence $\alpha 5$ must be smaller than a certain critical angle determined by the refraction indices of the light guide 1 and the environment outside the output surface 3 so that the light rays 10 can pass through the output surface 3.

The decoupling surface 4 further comprises the second decoupling elements 6 configured to direct light rays 10 to the output surface 3 in such a way that the light rays 10 fall onto the output surface 3 at the angle of incidence $\alpha 6$, ensuring exit of light rays 10 from the output surface 3 approximately in the pre-defined output direction d to guarantee fulfillment of the second light function. As explained, the angle $\alpha 6$ must be smaller than the above-mentioned critical angle.

The decoupling surface 4 further comprises a reflective element in the form of the fourth reflective surface 12, which is configured to direct light rays 10 towards the output surface 3 in such a way that light rays 10 fall onto it at the angle of incidence $\alpha 12$, which is bigger than the above-mentioned critical angle so that these light rays 10 get totally reflected on the output surface 3 and the rays 10 proceed further through the light guide 1.

Figure 3:
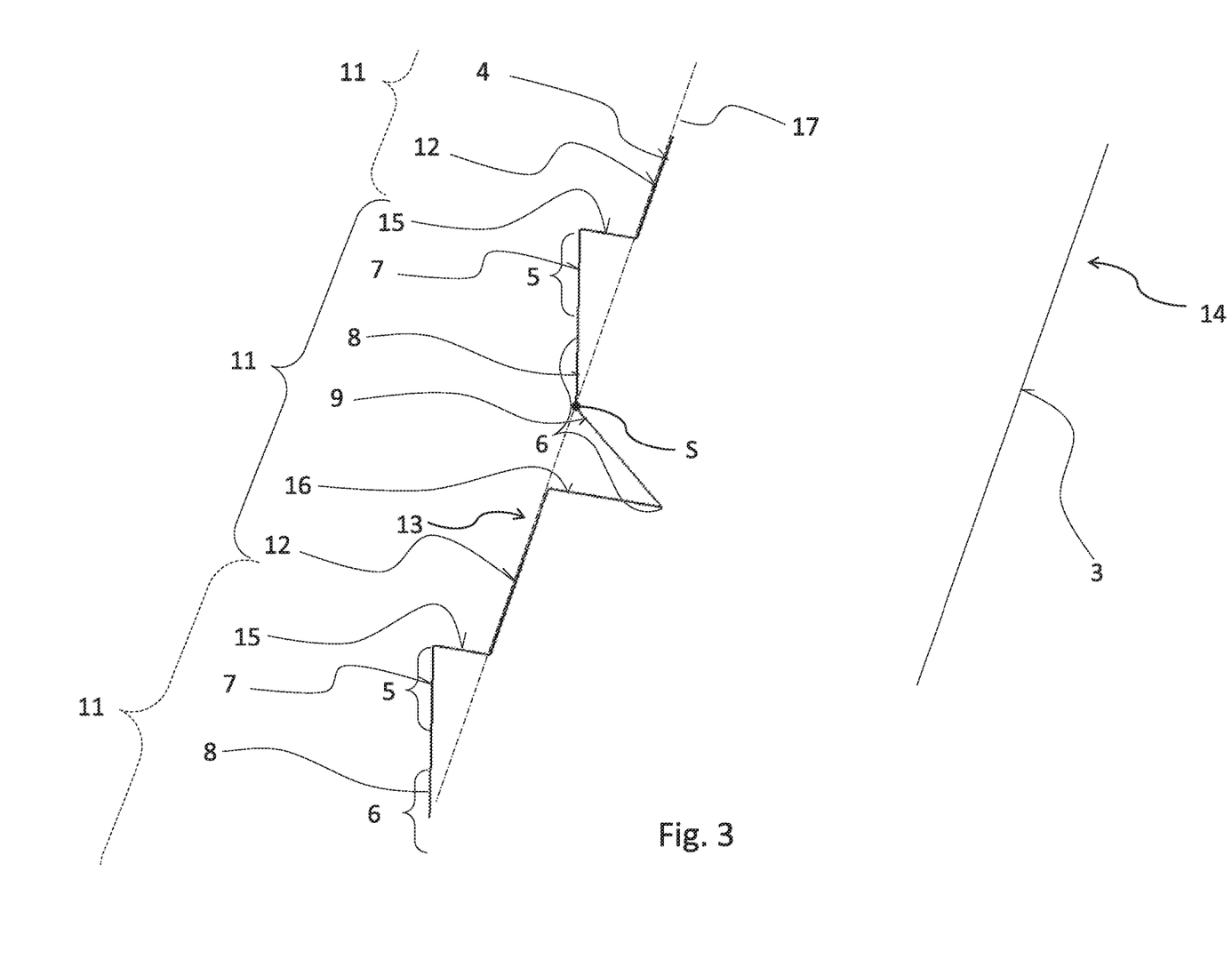
FIG. 3 shows, in a longitudinal cross-section through the longitudinal axis of the invention of FIG. 1, an embodiment example of the reflective surfaces of the reflective assembly of the optical system according to the invention.

FIG. 3 shows an embodiment example of the first decoupling element 5, the second decoupling element 6 and the fourth reflective surface 12, which are together part of the reflective arrangement 11 that is part of the decoupling surface 4. In this embodiment, the reflective arrangement 11 comprises the first decoupling element 5, the second decoupling element 6 and the fourth reflective surface 12 in this order from the light source 2. The first decoupling element 5 comprises the first reflective surface 7 that is, in the direction towards the light source 2, deflected from the opposite output surface 3 by the angle $\alpha$. Light rays 10 falling onto the first reflective surface 7 are reflected directly to the output surface 3, which they fall onto in such a way that they exit from it in the pre-defined first output direction p. The second decoupling element 6 comprises the second reflective surface 8 and the third reflective surface 9, which are preferably connected to each other, are oriented towards each other at an obtuse angle $\beta$, and are configured for reflection of light rays 10 falling onto the second reflective surface 8 directly onto the third reflective surface 9 and their reflection from the third reflective surface 9 directly to the output surface 3 and incidence on the output surface 3 at an angle excluding total reflection so that these light rays 10 exit from the light guide 1 through the output surface 3 approximately in the said second output direction d.

In the direction from the light source 2, the second reflective surface 8 is preferably situated in a direct extension of the first reflective surface 7. Further, the first reflective surface 7 and the second reflective surface 8 are preferably connected to each other.

In the embodiment shown in FIG. 3, the fourth reflective surface 12 and the connecting line s where the second reflective surface 8 gets in contact with the third reflective surface 9 lie on the central jacket surface 17 of the light guide 1. The central jacket surface 17 refers to a smooth surface without the projections and recesses formed by the first and second decoupling elements 5 and 6, which forms the surface of the light guide on its rear side 13 except for the said projections and recesses. The first set-off surface 15 then connects the fourth reflective surface 12 of the previous reflective arrangement 11 to the first reflective surface 7 of the next reflective arrangement 11. In each reflective arrangement 11, the second set-off surface 16 connects the third reflective surface 9 to the fourth reflective surface 12.

Figure 4:
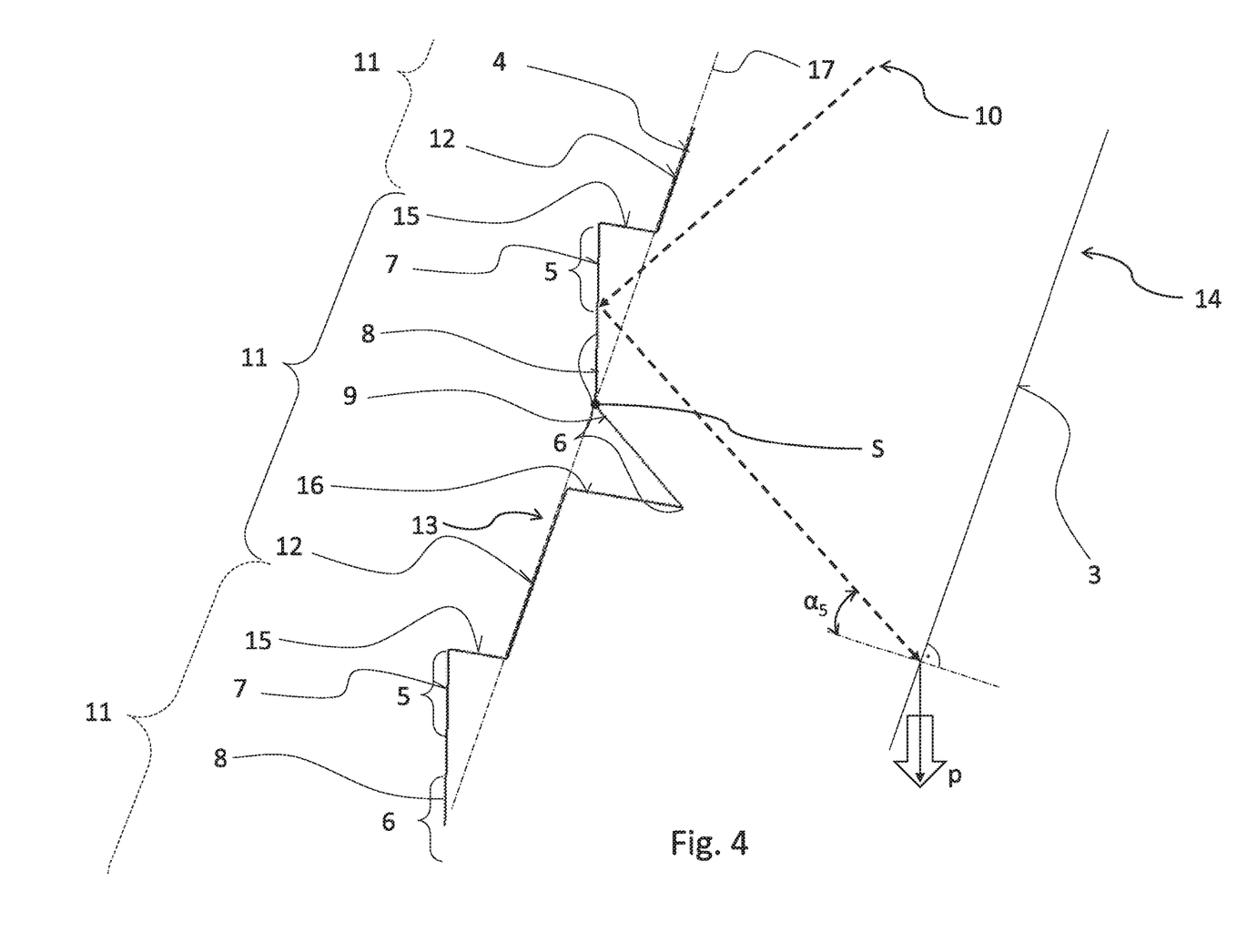
FIGS. 4 to 6 show the courses of light rays falling onto individual reflective surfaces of the optical system according to the invention.
Figure 5:
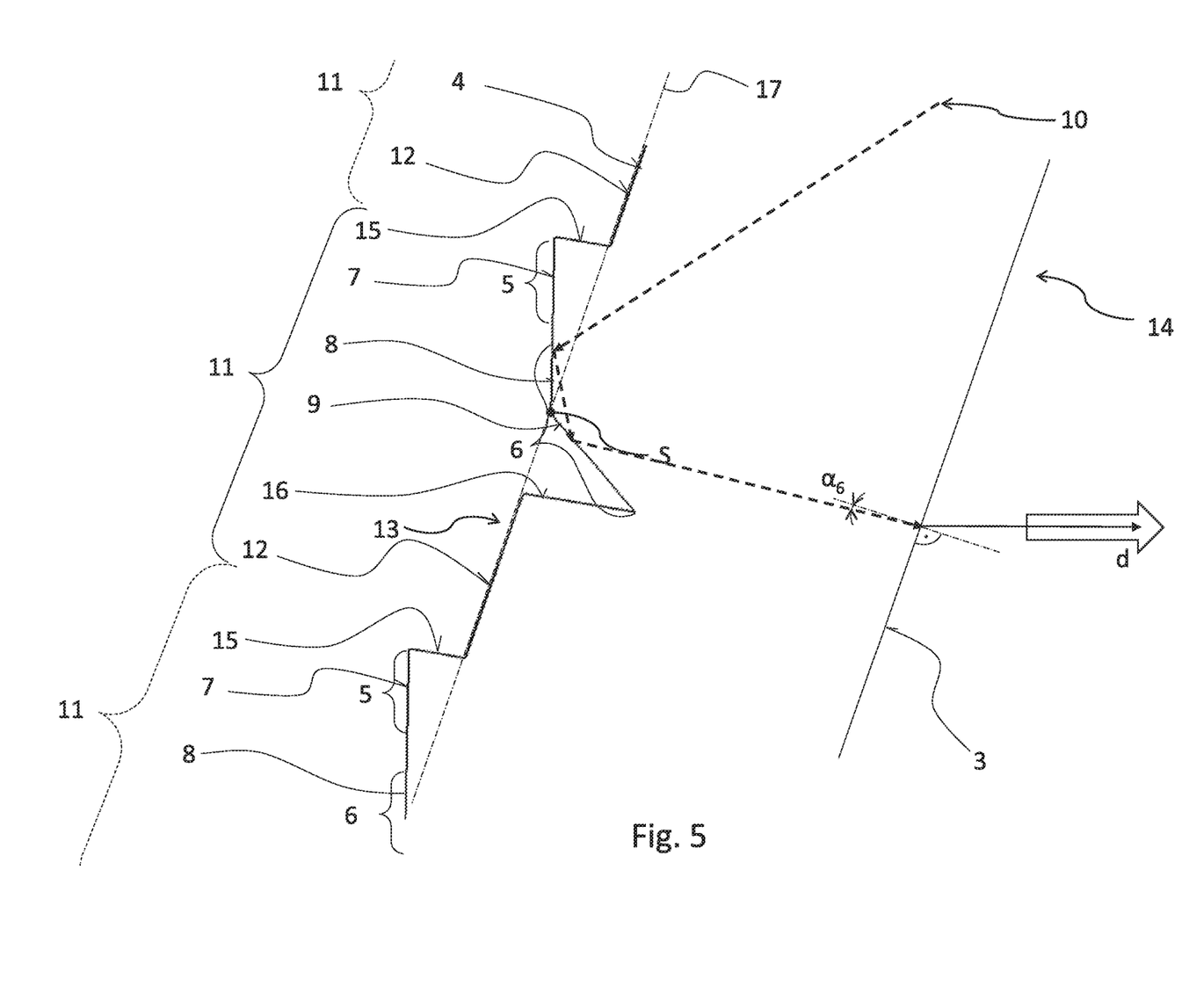
Figure 6:
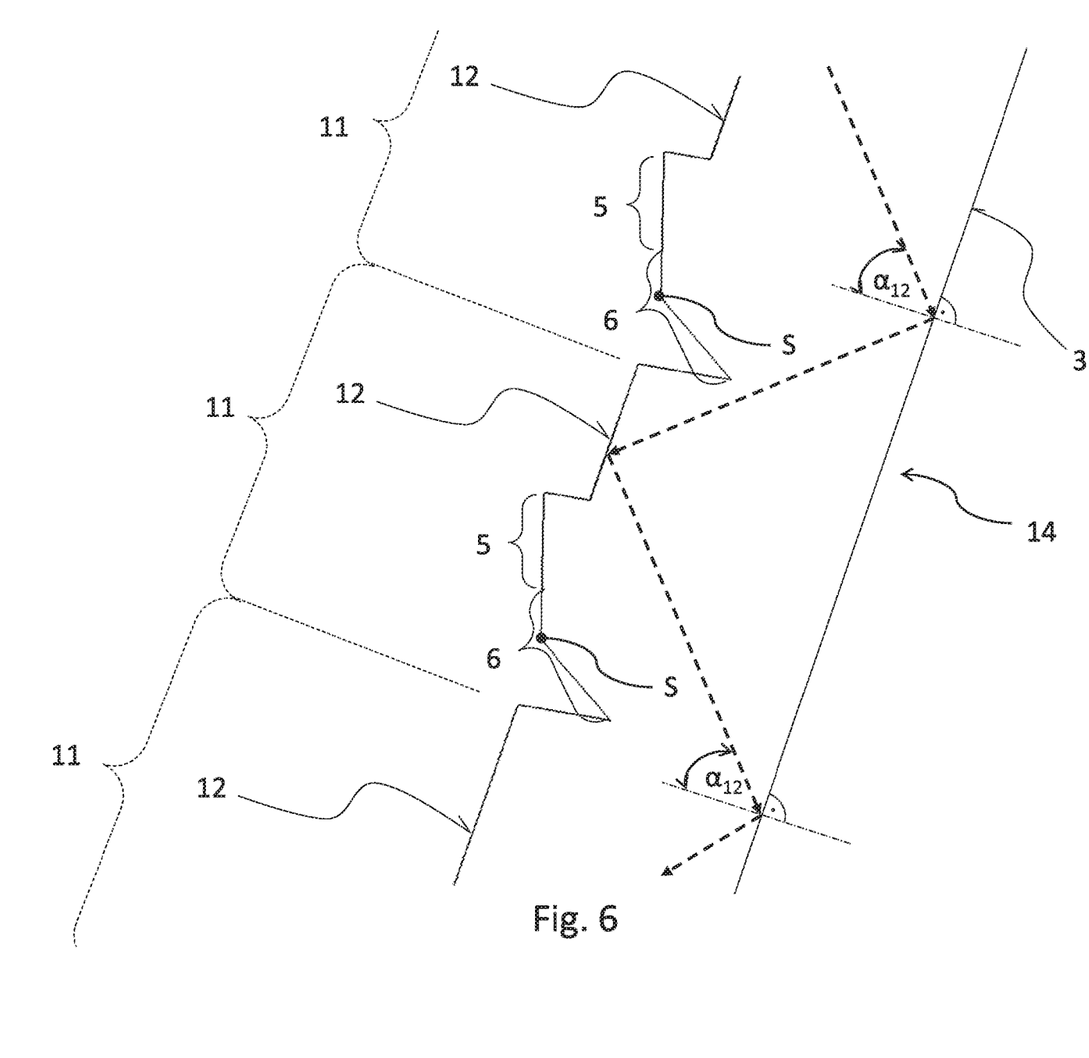

FIGS. 4 and 5 show similar courses of light rays 10 falling onto the first and second reflective elements 5, 6, and FIG. 6 then shows the course of light rays that fall onto the fourth reflective surface 12.

It should be noted that FIGS. 1 to 6 are not drawn in the proportional scale of the real embodiment of the light guide 1 fitted with a decoupling surface 4 with a reflective arrangement 11 according to the present invention. This is because compared to the real distance from the decoupling surface 4 to the output surface 3, which may be e.g. from 6 mm to 12 mm, the exemplary length of the reflective arrangement 11 measured in the longitudinal direction of the light guide 1 is in the range from 0.7 mm to 3.5 mm Therefore, the geometrical proportions cannot be drawn in the proportional scale for clarification purposes.

It is also obvious that the boundaries where individual reflective surfaces 7, 8, 9 and 12 begin and stop fulfilling their designed functions—i.e. directing rays for the output in a certain direction, or in the case of the fourth reflective surface 12 for total reflection from the output surface 3—cannot be exactly defined. What may happen in practice is that, e.g. in the place of transition from the first reflective surface 7 to the second reflective surface 8, there will be a certain mixed area where, depending on the exact angle of incidence of light rays 10 on this area, light rays 10 may be routed to both the directions p and d. Also, the beginning of the fourth reflective surface 12, i.e. the place from where on in the direction from the light source 2 light rays 10 will be reflected in such a way to fall onto the output surface 3 at an angle $\alpha 12$ bigger than the critical angle discussed above, will not be situated exactly in the place of connection to the second set-off surface 16 where in fact a microscopical area may be in "shade" caused by the vertex of the second decoupling element 6 or the end of the third reflective surface 9. Similarly, in practice, the first reflective surface 5 will not start at the place of connection to the first set-off surface 15 because a certain small area near this connection will be in shade caused by the vertex resulting from the connection of the fourth reflective surface 12 of the previous reflective arrangement 11 with the first set-off surface 15, which prevents light rays 10 from falling onto this area to be reflected as it is desired for the first decoupling element 5, i.e. the first reflective surface 7, directly to the output surface 3 and from there out of the light guide 1 in the first output direction p.

Lengths L of individual complex reflective arrangements 11, the same light guide 1 is equipped with, may be identical and/or at least two of the reflective arrangements 11, the same light guide 1 is equipped with, have different lengths L to achieve the required resulting effect or homogeneity. In other words, the required resulting appearance or homogeneity of the light image(s) produced by the light guide 1 can be achieved by suitable selection of lengths L of individual complex reflective arrangements 11 or the appearance can be significantly influenced.

LIST OF REFERENCE MARKS

1—light guide
2—light source
3—output surface
4—decoupling surface
5—first decoupling element
6—second decoupling element
7—first reflective surface
8—second reflective surface
9—third reflective surface
10—light ray
11—reflective arrangement
12—fourth reflective surface
13—rear side
14—front side
15—first set-off surface
16—second set-off surface
17—central jacket surface
α, α5, α6, α12, β—angle
p—first output direction
d—second output direction
s—connecting line

The invention claimed is:

1. A light-guiding optical system for motor vehicles comprising at least one light source and a light guide for coupling and guiding light rays (10) emitted by the light source,
wherein the light guide comprises a decoupling surface on a rear side of the light guide and an output surface for an exit of light rays decoupled by the decoupling surface on an opposite front side of the light guide,
wherein the decoupling surface comprises first decoupling elements configured to decouple the light rays falling onto the first decoupling elements out of the light guide approximately in a pre-determined first output direction to fulfill a first light function and a second decoupling element configured to decouple the light rays falling onto the second decoupling element out of the light guide approximately in a pre-determined second output direction diverted from the first output direction to fulfill a second light function, and
wherein the second decoupling element is a pair of reflective surfaces comprising a second reflective surface and a third reflective surface that together form an obtuse angle and are configured for reflection of the light rays that fell on the second reflective surface, directly onto the third reflective surface, and a consecutive reflection of the light rays from the third reflective surface directly to the output surface and incidence of the light rays on the output surface at an angle excluding a total reflection, so that these light rays exit from the light guide through the output surface approximately in the second direction.

2. The light-guiding optical system according to claim 1, wherein the light guide has an elongated shape, wherein the decoupling surface and the output surface are positioned in a longitudinal direction of the light guide.

3. The light-guiding optical system according to claim 1, wherein the first decoupling element is a first reflective surface which is inclined towards the output surface in a direction from the light source and is configured for reflection of the light rays falling onto the first reflective surface directly to the output surface and incidence of the light rays on the output surface at an angle excluding total reflection, so that the light rays exit from the light guide through the output surface approximately in the first output direction.

4. The light-guiding optical system according to claim 1, wherein in a direction from the light source, the second reflective surface is situated in a direct extension of the first reflective surface and a positional order in a direction from the light source is the first reflective surface, the second reflective surface and the third reflective surface.

5. The light-guiding optical system according to claim 1, wherein the first reflective surface and the second reflective surface are connected to each other.

6. The light-guiding optical system according to claim 1, wherein the second reflective surface and the third reflective surface are connected along a connecting line.

7. The light-guiding optical system according to claim 1, wherein the decoupling surface further comprises a fourth reflective surface configured for reflection of the light rays falling onto the fourth reflective surface, directly towards the output surface and incidence of the light rays on the output surface at an angle, which will cause total reflection of the light rays from the output surface and further propagation of the light rays through the light guide, wherein the first reflective surface, the second reflective surface, the third reflective surface and the fourth reflective surface are in a positional order from the light source and are part of a reflective arrangement that repeats itself in a longitudinal direction on the decoupling surface.

8. The light-guiding optical system according to claim 7, wherein the fourth reflective surface is approximately parallel to an opposite part of the output surface.

9. The light-guiding optical system according to claim 7, wherein the connecting line lies on a hypothetical surface that is a direct extension, in the direction towards the light source, of the fourth reflective surface.

10. The light-guiding optical system according to claim 7, wherein the light guide comprises a plurality of reflective arrangements, wherein lengths of the reflective arrangements are identical.

11. The light-guiding optical system according to claim 7, wherein the light guide comprises at least two reflective arrangements having different lengths in order to achieve the required resulting appearance and homogeneity.

12. The light-guiding optical system according to claim 7, wherein length of the reflective arrangement is approximately from 0.7 mm to 3.5 mm.

13. The light-guiding optical system according to claim 1, wherein the second reflective surface makes an angle from 95° to 150° with the third reflective surface.

14. The light-guiding optical system according to claim 1, wherein the first light function is a function of a tail light and the second light function is a function of a side clearance light.

15. The light-guiding optical system according to claim 1, wherein the first output direction makes an angle of approximately 90° with the second output direction and is approximately parallel to a longitudinal axis of a vehicle.

\* \* \* \* \*